US005928483A

United States Patent [19]

Szpak et al.

[11] Patent Number: 5,928,483

[45] Date of Patent: Jul. 27, 1999

[54] ELECTROCHEMICAL CELL HAVING A BERYLLIUM COMPOUND COATED ELECTRODE

[75] Inventors: Stanislaw J. Szpak; Pamela A. Boss, both of San Diego, Calif.

[73] Assignee: The United States of America as represented by the Secretary of the Navy, Washington, D.C.

[21] Appl. No.: 08/969,175

[22] Filed: Nov. 12, 1997

[51] Int. Cl.$^{6}$ .......... C25B 11/00

[52] U.S. Cl. .......... 204/290 R; 204/293; 204/272; 429/59; 429/101; 429/218.2; 429/231.6; 29/623.5; 29/746

[58] Field of Search .......... 204/290 R, 293, 204/243.1, 272; 429/59, 101, 218.2, 231.6; 29/746, 623.5

[56] References Cited

U.S. PATENT DOCUMENTS 4,393,125 7/1983 Skarstad et al. .
4,528,084 7/1985 Beer et al. .
4,560,444 12/1985 Polak et al. .
4,585,579 4/1986 Bommaraju et al. .......... 252/387
4,655,892 4/1987 Satta et al. .
4,677,041 6/1987 Specht .
4,795,533 1/1989 Young et al. .
5,032,474 7/1991 Hunter .
5,298,340 3/1994 Cocks et al. .
5,466,543 11/1995 Ikoma et al. .......... 429/59
5,690,799 11/1997 Tsukahara et al. .......... 204/290 R

*Primary Examiner*—Bruce F. Bell
*Attorney, Agent, or Firm*—Harvey Fendelman; Peter A. Lipovsky; Michael A. Kagan

[57] ABSTRACT

An electrochemical cell comprises a container; an electrolyte held within the container, a first electrode positioned in the electrolyte; and a second electrode having a beryllium compound coating. The second electrode is positioned in the electrolyte and generally centered within the first electrode. The second electrode is made of a material selected from the group that includes palladium, $AB_2$ alloys, and $AB_5$ alloys, where A represents magnesium, zirconium, and lanthanum, and B represents vanadium, chromium, manganese, or nickel. The beryllium compound coating is formed by charging the second electrode in the presence of a beryllium salt.

10 Claims, 2 Drawing Sheets

ELECTROCHEMICAL CELL HAVING A BERYLLIUM COMPOUND COATED ELECTRODE

BACKGROUND OF THE INVENTION

The present invention generally relates to the field of electrochemistry, and more particularly, to an electrochemical cell having a metal hydride electrode.

Metal hydride systems show a great deal of promise as electrical energy storage devices due to their high theoretical energy and power densities, rechargeability, and potential broad range applications. Although the first intermetallic hydride was developed thirty years ago and despite construction of the first prototype metal hydrogen electrode twenty years ago, metal hydrogen electrodes still experience many shortcomings. These include high cost of alloys, poor hydrogen storage capabilities, difficult activation, pyrophoricity, problems of impurities, thermodynamic instabilities, embrittlement, and corrosion in alkaline media.

There are two classes of metal hydride alloys employed as negative electrodes. They are the $AB_2$ and $AB_5$ ($LaNi_5$) alloys, where A may be represent magnesium, zirconium, and lanthanum, and B may be substituted by nickel, vanadium, chromium, or manganese. Both classes of alloys include many additional metal components which improve performance, life, and self-discharge. The rate at which $AB_2$ or $AB_5$ alloys can absorb hydrogen generated electrochemically and the degree of loading is greatly influenced by the interphase region formed when an electrode is exposed to an electrolyte. In the simplest case, the interphase region takes the form of the electrical double layer. In the more complex cases and, in particular, during the charge transfer reaction, it consists of layers, each associated with a participating elementary process. In this representation, the interphase region is an open system in which a number of consecutive processes takes place, of which the slowest one determines the rate. These processes include transport of the reactants from the bulk to the electrode surface by diffusion, adsorption on the electrode surface, charge transfer, desorption of the reaction products, followed by transport of the reaction products away from the electrode surface. In a discharging battery, these same processes occur; however, in a battery the electrons ultimately flow into an external circuit where the electrical work is delivered. In the negative electrode, the relevant processes during charge/discharge of a metal hydride battery occurs in a multi phase environment—gas, liquid, and solid.

The central role of the interphase in transport of electrochemically generated hydrogen into the electrode interior has been discussed recently and the non-autonomous character of the interphase was stressed. It was shown that the interphase is an active element and that its properties are determined by those of the contacting phases, i.e., the electrode interior as well as the electrolyte. The interphase region may be affected in the course of battery operation, especially as a result of cycling. During charging/discharging operational modes, the electrode matrix expands and contracts. With cycling, this mechanical stress results in embrittlement and consequent loss of performance by the electrochemical cell.

Therefore, a need exists for an additive which would 1) control both electrodic reactions and transport properties; 2) allow high degrees of H/M loading, and 3) reduce the effects of mechanical stress during cycling to provide increased life of batteries and/or fuel cells.

SUMMARY OF THE INVENTION

The present invention provides an electrochemical cell which comprises a container, an electrolyte held within the container, a first electrode positioned in the electrolyte; and a second electrode having a beryllium compound coating. The second electrode is positioned in the electrolyte and generally centered within the first electrode. The second electrode preferably is made of a material selected from the group that includes palladium, $AB_2$ alloys, and $AB_5$ alloys. The beryllium compound coating is believed to prevent or at least greatly diminish embrittlement of the second electrode that would otherwise occur during charging and discharge cycling of the electrochemical cell. The beryllium compound coating may be formed by charging the second electrode in the presence of a beryllium salt.

Another aspect of the invention is directed to an electrode comprising a substrate and a beryllium compound coating formed on the substrate. The substrate preferably is made of a material selected from the group that includes palladium, $AB_2$ alloys, and $AB_5$ alloys. The electrode is formed by employing the electrode as a cathode in an electrolyte solution containing a water soluble beryllium salt. The beryllium salt disassociates which frees a beryllium cation, $Be^{++}$, which migrates to and is deposited on the electrode.

The beryllium compound coating on the electrode increases the hydrogen storage capacities of the electrode, as well as its discharge/charging cycling lifetime. In general, any water soluble beryllium salt can be used as a source of beryllium, which is simply added to a suitable electrolyte.

BRIEF DESCRIPTION OF THE DRAWINGS

Throughout the several view, like elements are referenced using like references.

DESCRIPTION OF THE PREFERRED EMBODIMENT

Figure 1:
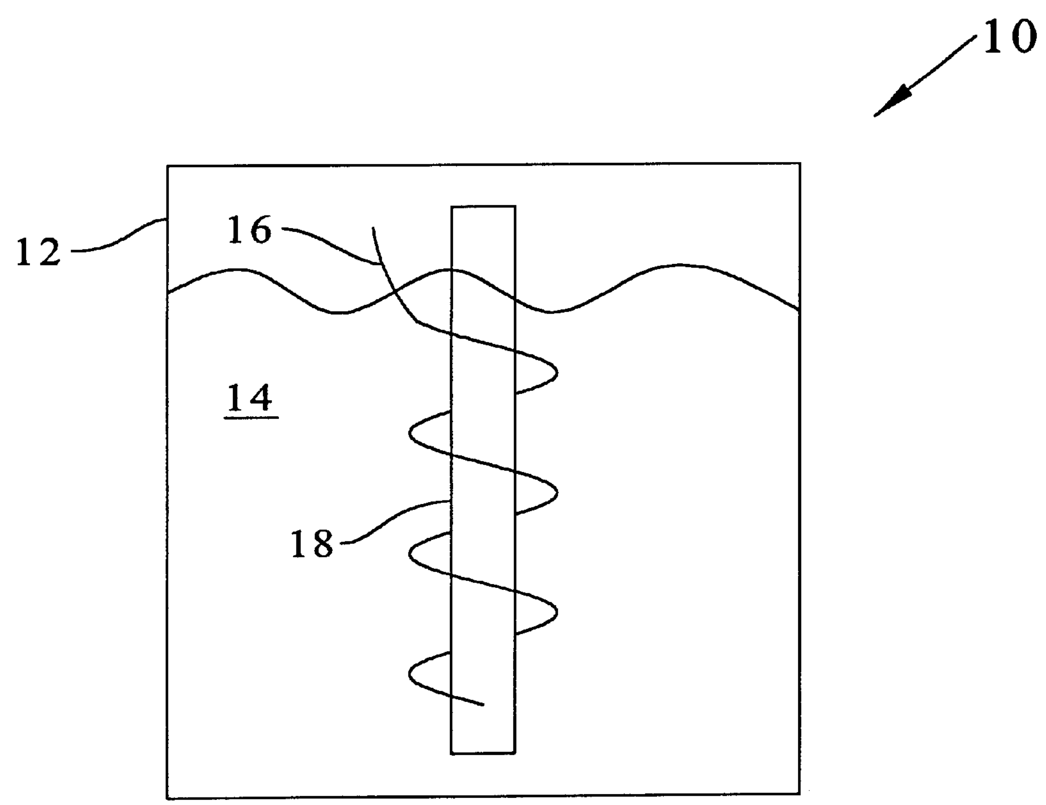
FIG. 1 shows an electrochemical cell embodying various features of the present invention.
Figure 2:
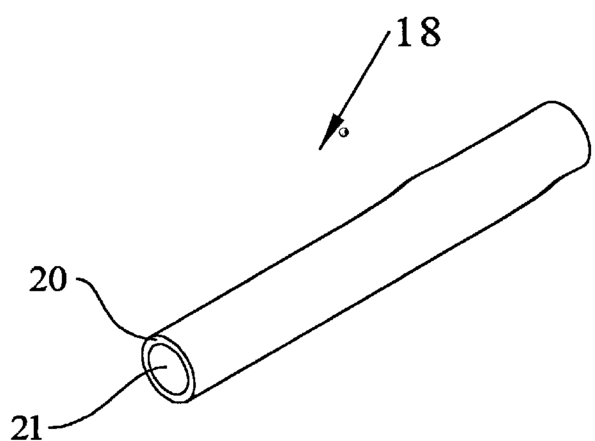
FIG. 2 is a perspective, end-on view of the cathode used in the electrochemical cell of FIG. 1 showing the beryllium coating.

Referring to FIG. 1, there is shown an electrochemical cell 10 which comprises a container 12, an electrolyte 14, a first electrode, or anode 16 positioned in the electrolyte 14, and a second electrode, or cathode 18 which includes, as shown in FIG. 2, a substrate on which is formed a beryllium compound coating 20. The first and second electrodes 16 and 18, respectively are immersed in the electrolyte 14. The second electrode 18 is generally centered within the first electrode 16, shown by way of example to be configured as a helix. However, it is to be understood that the first electrode 16 may be configured into other three dimensional shapes as long as they assure uniform current distribution. The second electrode 18 preferably is made of a material selected from the group that includes palladium, and metal hydride alloys such as $AB_2$ alloys, and $AB_5$ alloys. The first electrode may be made of platinum or any other electrically conductive material which does not corrode in the electrolyte 14. The second electrode 18 is preferably centered within the first electrode 16 so that there is uniform current density between the electrodes 16 and 18 both during recharging and discharging operational modes of the electrochemical cell 10.

Figure 3:
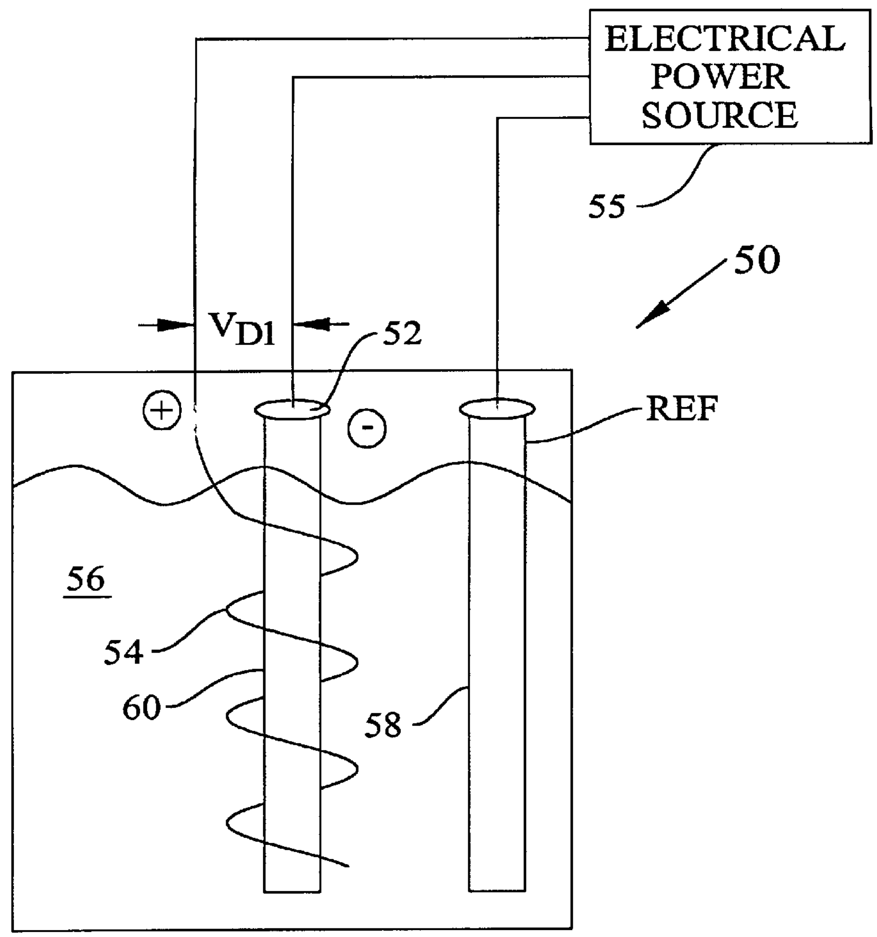
FIG. 3 shows an electrochemical cell which may be used for manufacturing a cathode having a beryllium compound coating.

An example of the manufacture of electrode 18 is described with reference to FIG. 3. An electrochemical cell 50 was created that includes a container, cathode 52, platinum anode 54, and electrolyte 56 in which the cathode 52 and anode 54 are immersed. Palladium (Pd) foil served as the cathode 52 and was charged for about 8 hours with hydrogen or its isotopes from electrolyte 56 consisting essentially of 0.3 M $Li_2SO_4$ to which 100 ppm of beryllium sulfate ($BeSO_4$) was added. Another suitable water soluble beryllium salt is beryllium chloride ($BeCl_2$). An electrical power source 55, such as a potentiostat, was used to charge cathode 52 potentiostatically with respect to a reference electrode 58 made of Ag/AgCl which also was immersed in the electrolyte 56. The beryllium salt dissolved in the electrolyte 56 provides $Be^{+2}$ ions. Electrical current flow between the cathode 52 and anode 54 varied between $-10/cm^2$ mA to $-1$ $A/cm^2$. When the charging was terminated, the Pd electrode 52 had a reddish-brown beryllium compound coating 60 having a thickness estimated to be few microns formed on the surface of cathode 52. The coating 60 is believed to have been an insoluble beryllium compound. The beryllium compound coating 60 then was scraped away, to reveal that the Pd cathode 52 had a pristine appearance. An important advantage of the invention is that the Pd cathode 52 was not black or brittle as observed in experiments which did not have beryllium added to the electrolyte. Although the electrolyte 56 contained 100 ppm of beryllium sulfate, it is to be understood that the invention may be practiced with either lesser or greater concentrations of beryllium in an electrolytic solution, so long as there is enough beryllium to coat the electrode of interest. By way of example, the voltage difference, $V_{D1}$ between the cathode 52 and the anode, or counter electrode 54 was in the range of about $-2.5$ V to $-2.0$ V.

The hydrogen sorption of metal hydrides depends, in part, upon its metallurgy. During charging/discharging cycles of a metal hydride electrode, the lattice of the electrode expands and contracts. The resultant mechanical stresses caused by the charging/discharging cycles to which the electrode is subjected result in the formation of micro cracks of the electrode, usually along grain boundaries and metallurgical defects. Such micro cracks are believed to provide an escape route for sorbed hydrogen out of the lattice of the metal comprising the electrode. As a result, both hydrogen storage capacity of the electrode cycle lifetime are greatly reduced.

Electrode 18 may also be manufactured of particles of $AB_2$ or $AB_5$ alloys which are coated with palladium. The palladium coating may be applied by electroless plating, or by barrel plating at low current densities from a solution which may contain 0.1 to 1 M $Pd(NH_3)_4Cl_2$ salt. The coated particles then are pressure sintered to provide a rigid, porous structure having voids that expose a large surface area of the electrode on which the beryllium coating then may be formed. The particles may range in size from submicron to several microns, depending on the requirements of a particular application. An electrode 18 formed by the techniques described above has a higher density of hydrogen absorbing material and, therefore provides higher hydrogen content to an electrochemical cell compared to a cell which includes an electrode formed with an electrically conductive binding material. A pressure sintered electrode 18 offers flexibility in design because of porosity control, i.e., it may be used in low discharge rate applications, high discharge rate applications, or applications that require a broad range of discharge rates.

Obviously, many modifications and variations of the present invention are possible in light of the above teachings. For example, other effective additives to the electrolyte are magnesium salt or thiourea could be used in place of beryllium. It is therefore to be understood that within the scope of the appended claims, the invention may be practiced otherwise than as specifically described.

We claim:

1. An electrochemical cell, comprising:

a container;

an electrolyte in said container;

a first electrode positioned in said electrolyte; and a second electrode having a beryllium compound coating positioned in said electrolyte.

2. The electrochemical cell of claim 1 wherein said second electrode is made of a material selected from the group that includes palladium, $AB_2$ alloys, and $AB_5$ alloys, where A represents magnesium, zirconium, and lanthanum, and B represents vanadium, chromium, manganese, or nickel.

3. The electrochemical cell of claim 1 wherein said second electrode is generally centered within said first electrode.

4. A method for manufacturing an electrochemical cell, comprising the steps of:

fabricating an electrochemical cell which includes:

a container;

an electrolyte solution which includes a water soluble beryllium salt contained in said container;

a first electrode positioned in said electrolyte; and a second electrode positioned in said electrolyte;

charging said second electrode to form a beryllium compound coating on said second electrode.

5. The method of claim 4 wherein said second electrode is made of a material selected from the group that includes palladium, $AB_2$ alloys, and $AB_5$ alloys, where B represents vanadium, chromium, manganese, or nickel.

6. The method of claim 4 wherein said second electrode is generally centered within said first electrode.

7. The electrochemical cell of claim 4 wherein said beryllium salt is selected from the group that includes beryllium sulfate and beryllium chloride.

8. An electrode, comprising:

a substrate made of a material selected from the group that includes palladium, $AB_2$ alloys, and $AB_5$ alloys, where A represents magnesium, zirconium, and lanthanum, and B represents vanadium, chromium, manganese, or nickel; and a beryllium compound coating formed on said substrate.

9. An electrochemical cell, comprising:

a first container;

a first electrolyte contained in said first container;

a first electrode positioned in sad first electrolyte; and a second electrode positioned in said first electrolyte, where said second electrode is made of a material selected from the group that includes palladium, $AB_2$ alloys, and $AB_5$ alloys, B represents vanadium, chromium, manganese, or nickel, and said second electrode has a beryllium compound coating; and said second electrode is manufactured by contacting said second electrode and a third electrolyte to a second electrolyte solution which includes a beryllium salt and charging said second electrode to form said beryllium compound coating on said second electrode.

10. An electrochemical cell, comprising:

a first container;

a first electrolyte contained in said first container;

a first electrode positioned in said first electrolyte; and a second electrode positioned in said first electrolyte, where said second electrode is made of a material selected from the group that includes palladium, $AB_2$ alloys, and $AB_5$ alloys, B represents vanadium, chromium, manganese, or nickel, and said second electrode has a beryllium compound coating; and said second electrode is manufactured by contacting said second electrode and a third electrolyte to a second electrolyte solution which includes a material selected from the group consisting essentially of magnesium salt and thiourea, and charging said second electrode.

* * * * *